US009134555B2

(12) United States Patent  
Kashiwagi et al.

(10) Patent No.: US 9,134,555 B2  
(45) Date of Patent: Sep. 15, 2015

(54) LIQUID CRYSTAL OPTICAL DEVICE TO CHANGE DISTRIBUTION OF REFRACTIVE INDEX BY APPLYING VOLTAGES TO UTILIZE BIREFRINGENCE OF LIQUID CRYSTAL MOLECULES, IMAGE DISPLAY APPARATUS, AND DRIVE DEVICE

(71) Applicant: Kabushiki Kaisha Toshiba, Minato-ku, Tokyo (JP)

(72) Inventors: Masako Kashiwagi, Kanagawa-ken (JP); Shinichi Uehara, Tokyo (JP); Ayako Takagi, Kanagawa-ken (JP); Yoshiharu Momonoi, Kanagawa-ken (JP); Masahiro Baba, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 136 days.

(21) Appl. No.: 13/875,759

(22) Filed: May 2, 2013

(65) Prior Publication Data

US 2014/0063430 A1     Mar. 6, 2014

(30) Foreign Application Priority Data

Sep. 5, 2012   (JP) ................. 2012-195227

(51) Int. Cl.
*G02F 1/133*     (2006.01)
*G02B 27/22*     (2006.01)
*H04N 13/04*     (2006.01)
*G02F 1/1337*    (2006.01)
(Continued)

(52) U.S. Cl.
CPC ........ *G02F 1/13306* (2013.01); *G02B 27/2214* (2013.01); *H04N 13/0404* (2013.01);
(Continued)

(58) Field of Classification Search
CPC ............. G02B 27/2214; G02B 27/095; H04N 13/0404; H04N 13/0452; G09G 3/003; G02F 1/13306; G02F 2001/13373; G02F 2001/294; G02F 2201/124; G02F 2001/134381; G02F 1/33526; G02F 1/1343; G02F 1/29
USPC ................. 345/419, 95; 349/15, 33, 139, 141
See application file for complete search history.

(56) References Cited

U.S. PATENT DOCUMENTS

2012/0162592 A1   6/2012   Takagi et al.
2013/0250188 A1   9/2013   Uehara et al.
2013/0271678 A1  10/2013   Uehara et al.

FOREIGN PATENT DOCUMENTS

JP       3940725      4/2007

OTHER PUBLICATIONS

Notification of Reason(s) for Refusal issued by the Japanese Patent Office on Jun. 10, 2014, for Japanese Patent Application No. 2012-195227, and English-language translation thereof.
(Continued)

*Primary Examiner* — Larry Sternbane
(74) *Attorney, Agent, or Firm* — Finnegan, Henderson, Farabow, Garrett & Dunner, L.L.P.

(57) ABSTRACT

A liquid crystal optical device includes a liquid crystal optical unit and a drive unit. The liquid crystal optical unit includes a first substrate unit, a second substrate unit, and a liquid crystal layer. The first substrate unit includes a first substrate, a plurality of first electrodes, and a second electrode. The second substrate unit includes a second substrate and a first opposing electrode. The drive unit applies a first voltage between the first opposing electrode and the first electrodes and applies a second voltage between the first opposing electrode and the second electrode in a refractive index distribution forming operation. The drive unit applies a third voltage between the first opposing electrode and the first electrodes and applies a fourth voltage between the first opposing electrode and the second electrode in a first preliminary operation prior to the refractive index distribution forming operation.

20 Claims, 14 Drawing Sheets

(51) Int. Cl.
*G02F 1/1343* (2006.01)
*G02F 1/29* (2006.01)
*G02B 27/09* (2006.01)

(52) U.S. Cl.
CPC ..... *G02B27/095* (2013.01); *G02F 2001/13373* (2013.01); *G02F 2001/134381* (2013.01); *G02F 2001/294* (2013.01); *G02F 2201/124* (2013.01)

(56) References Cited

OTHER PUBLICATIONS

Extended European Search Report issued by the European Patent Office on Dec. 6, 2013, for European Patent Application No. 13166133.2.

Ye et al., "Two-dimensional focus control for liquid crystal lens," Proceedings of SPIE (Dec. 23, 2003), pp. 242-249.

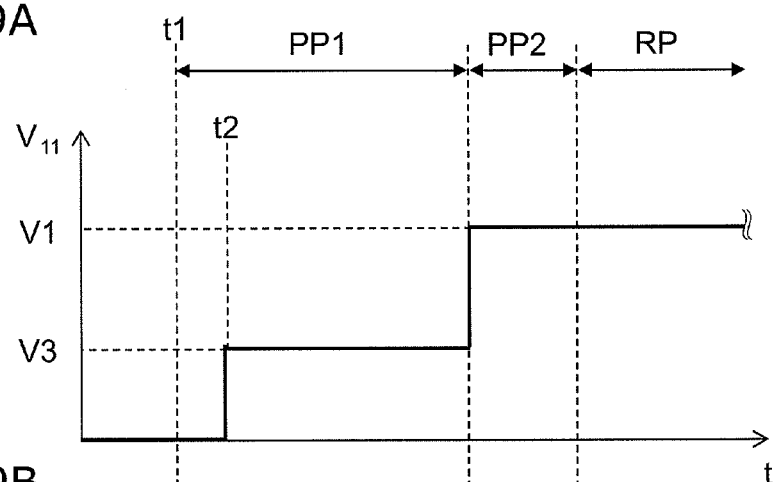
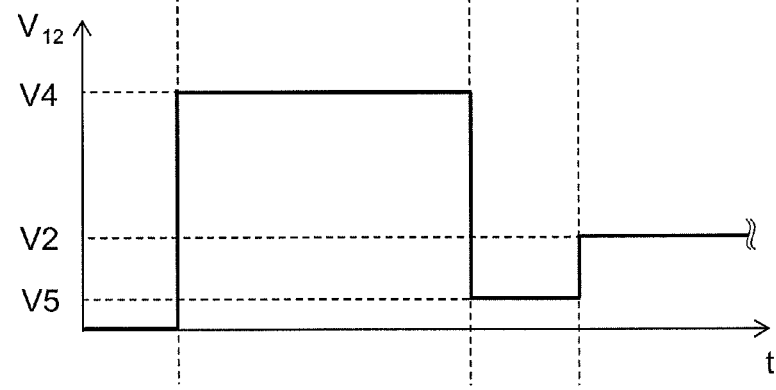

LIQUID CRYSTAL OPTICAL DEVICE TO CHANGE DISTRIBUTION OF REFRACTIVE INDEX BY APPLYING VOLTAGES TO UTILIZE BIREFRINGENCE OF LIQUID CRYSTAL MOLECULES, IMAGE DISPLAY APPARATUS, AND DRIVE DEVICE

CROSS-REFERENCE TO RELATED APPLICATIONS

This application is based upon and claims the benefit of priority from the prior Japanese Patent Application No. 2012-195227, filed on Sep. 5, 2012; the entire contents of which are incorporated herein by reference.

FIELD

Embodiments described herein relate generally to a liquid crystal optical device, an image display apparatus, and a drive device.

BACKGROUND

There is a liquid crystal lens device including a liquid crystal optical unit that changes the distribution of the refractive index according to the application of a voltage by utilizing the birefringence of liquid crystal molecules. There is a drive device for driving the liquid crystal optical unit. Also, there is an image display apparatus that combines the liquid crystal lens device and the image display unit.

By changing the distribution of the refractive index of the liquid crystal optical unit, the image display apparatus switches between a state in which the image displayed by the image display unit is caused to be incident on the eyes of a human viewer as displayed by the image display unit and a state in which the image displayed by the image display unit is caused to be incident on the eyes of the human viewer as multiple parallax images. Thereby, a two-dimensional image display operation and a three-dimensional image display operation are realized. High display quality is necessary for such an image display apparatus.

BRIEF DESCRIPTION OF THE DRAWINGS

FIG. 9A and FIG. 9B are graphs showing other operations of the liquid crystal optical device and the image display apparatus according to the first embodiment;

DETAILED DESCRIPTION

Figure 1:
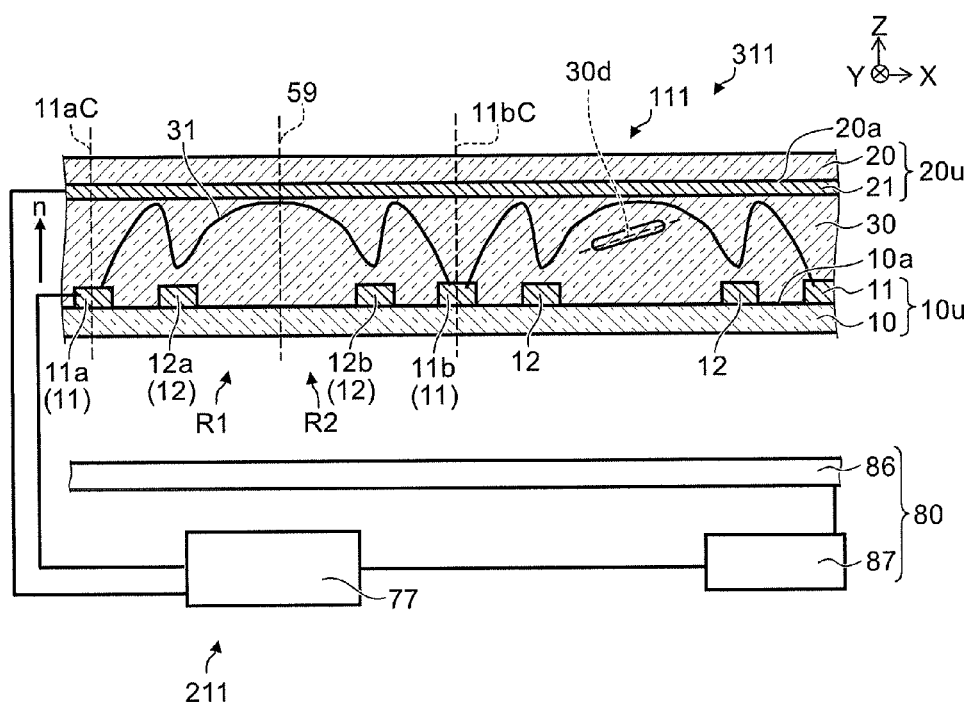
FIG. 1 is a schematic cross-sectional view showing a liquid crystal optical device and an image display apparatus according to a first embodiment.

According to one embodiment, a liquid crystal optical device includes a liquid crystal optical unit and a drive unit. The liquid crystal optical unit includes a first substrate unit, a second substrate unit, and a liquid crystal layer. The first substrate unit includes a first substrate, a plurality of first electrodes, and a second electrode. The first substrate has a first major surface. The first electrodes are provided on the first major surface to extend in a first direction. The second electrode is provided between the first electrodes on the first major surface to extend in the first direction. The second substrate unit includes a second substrate and a first opposing electrode. The second substrate has a second major surface. The second major surface opposes the first major surface. The first opposing electrode is provided on the second major surface. The liquid crystal layer is provided between the first substrate unit and the second substrate unit. The drive unit is electrically connected to the first electrodes, the second electrode, and the first opposing electrode. The drive unit is configured to implement a first operation to form a refractive index distribution in the liquid crystal layer and a first preliminary operation prior to the first operation. The drive unit is configured to apply a first voltage between the first opposing electrode and the first electrodes and apply a second voltage between the first opposing electrode and the second electrode in the first operation. The drive unit is configured to apply a third voltage between the first opposing electrode and the first electrodes and apply a fourth voltage between the first opposing electrode and the second electrode in the first preliminary operation. An absolute value of the third voltage is less than the absolute value of the first voltage. An absolute value of the fourth voltage is greater than the absolute value of the third voltage.

Various embodiments will be described hereinafter with reference to the accompanying drawings.

The drawings are schematic or conceptual; and the relationships between the thicknesses and the widths of portions, the proportions of sizes between portions, etc., are not necessarily the same as the actual values thereof. Further, the dimensions and/or the proportions may be illustrated differently between the drawings, even for identical portions.

In the drawings and the specification of the application, components similar to those described in regard to a drawing

First Embodiment

FIG. 1 is a schematic cross-sectional view showing a liquid crystal optical device and an image display apparatus according to a first embodiment.

As shown in FIG. 1, the image display apparatus 311 according to the embodiment includes the liquid crystal optical device 211 and an image display unit 80. The image display unit 80 may include any display device. For example, a liquid crystal display device, an organic EL display device, a plasma display, etc., may be used.

The liquid crystal optical device 211 includes a liquid crystal optical unit 111 and a drive unit 77.

The liquid crystal optical unit 111 includes a first substrate unit 10u, a second substrate unit 20u, and a liquid crystal layer 30.

The first substrate unit 10u includes a first substrate 10, multiple first electrodes 11, and a second electrode 12.

The first substrate 10 has a first major surface 10a. The multiple first electrodes 11 are provided on the first major surface 10a. Each of the multiple first electrodes 11 extends in a first direction. The multiple first electrodes 11 are arranged in a direction that intersects the first direction. Three of the multiple first electrodes 11 are shown in FIG. 1. The number of the multiple first electrodes 11 is arbitrary.

The first direction is taken as a Y-axis direction. A second direction parallel to the first major surface 10a and perpendicular to the Y-axis direction is taken as an X-axis direction. A direction perpendicular to the X-axis direction and the Y-axis direction is taken as a Z-axis direction.

The multiple first electrodes 11 are arranged, for example, along the X-axis direction.

Two most proximal first electrodes 11 of the multiple first electrodes 11 will now be focused upon. One of the two most proximal first electrodes 11 is taken as a first major electrode 11a. The other of the two most proximal first electrodes 11 is taken as a second major electrode 11b.

A central axis 59 is between the most proximal first electrodes 11 (e.g., the first major electrode 11a and the second major electrode 11b). The central axis 59 is parallel to the Y-axis direction and passes through a midpoint of a line segment connecting a center 11aC in the X-axis direction of the first major electrode 11a to a center 11bC in the X-axis direction of the second major electrode 11b when projected onto the X-Y plane (a plane parallel to the first major surface 10a).

The region of the first major surface 10a between the central axis 59 and the first major electrode 11a which is the one of the two most proximal first electrodes 11 is taken as a first region R1. The region of the first major surface 10a between the central axis 59 and the second major electrode 11b which is the other of the two most proximal first electrodes 11 is taken as a second region R2. The direction from the first major electrode 11a toward the second major electrode 11b is taken to be the +X direction. The direction from the second major electrode 11b toward the first major electrode 11a corresponds to the −X direction.

The second electrode 12 is provided between the multiple first electrodes 11 on the first major surface 10a and extends in the Y-axis direction. In this example, multiple second electrodes 12 are provided. Each of the multiple second electrodes 12 is provided between the multiple first electrodes 11 on the first substrate 10. The multiple second electrodes 12 extend in the Y-axis direction and are separated from the multiple first electrodes 11 in the X-axis direction. In this example, at least a first sub electrode 12a and a second sub electrode 12b are provided as the second electrodes 12.

The first sub electrode 12a of the multiple second electrodes 12 is provided on the first major surface 10a in the first region R1. The second sub electrode 12b of the multiple second electrodes 12 is provided on the first major surface 10a in the second region R2.

The second substrate unit 20u includes a second substrate 20 and an opposing electrode (a first opposing electrode) 21. The second substrate 20 has a second major surface 20a opposing the first major surface 10a. The opposing electrode 21 is provided on the second major surface 20a.

The first substrate 10, the first electrodes 11, the second electrodes 12, the second substrate 20, and the opposing electrode 21 are transmissive to light. Specifically, these components are transparent.

The first substrate 10 and the second substrate 20 may include, for example, a transparent material such as glass, a resin, etc. The first substrate 10 and the second substrate 20 have plate configurations or sheet configurations. The thicknesses of the first substrate 10 and the second substrate 20 are, for example, not less than 50 micrometers ($\mu$m) and not more than 2000 $\mu$m. However, the thicknesses are arbitrary.

The first electrodes 11, the second electrodes 12, and the opposing electrode 21 include, for example, an oxide including at least one (one type) of element selected from the group consisting of In, Sn, Zn, and Ti. These electrodes may include, for example, ITO. For example, at least one selected from $In_2O_3$ and $SnO_3$ may be used. The thicknesses of these electrodes are, for example, about 200 nanometers (nm) (e.g., not less than 100 nm and not more than 350 nm). The thicknesses of the electrodes are set to be, for example, thicknesses to obtain a high transmittance with respect to visible light.

The disposition pitch of the first electrodes 11 (the distance between the X-axis direction centers of the most proximal first electrodes 11) is, for example, not less than 10 $\mu$m and not more than 1000 $\mu$m. The disposition pitch is set to match the desired specifications (the characteristics of the gradient index lens described below). The lengths (the widths) of the first electrode 11 and the second electrode 12 along the X-axis direction are, for example, not less than 5 $\mu$m and not more than 300 $\mu$m.

In this example, the second electrodes 12 are adjacent to the first electrodes 11. More specifically, the first sub electrode 12a is adjacent to the first major electrode 11a; and the second sub electrode 12b is adjacent to the second major electrode 11b. The distance along the X-axis direction between the first electrode 11 and the second electrode 12 is, for example, not more than ¼ times the distance in the X-axis direction between the X-axis direction centers of the two most proximal first electrodes 11. The distance along the X-axis direction between the first major electrode 11a and the first sub electrode 12a and the distance along the X-axis direction between the second major electrode 11b and the second sub electrode 12b are, for example, not less than 5 $\mu$m and not more than 120 $\mu$m.

The liquid crystal layer 30 is provided between the first substrate unit 10u and the second substrate unit 20u. The liquid crystal layer 30 includes a liquid crystal material. The liquid crystal material may include a nematic liquid crystal (having a nematic phase at the temperature of use of the liquid crystal optical unit 111). The liquid crystal material has a positive dielectric anisotropy or a negative dielectric anisotropy. In the case of the positive dielectric anisotropy, the initial alignment of the liquid crystal of the liquid crystal layer 30 (the alignment when a voltage is not applied to the liquid crystal layer 30) is, for example, a horizontal alignment. In the case of the negative dielectric anisotropy, the initial alignment of the liquid crystal of the liquid crystal layer 30 is a vertical alignment.

The length (the thickness) of the liquid crystal layer 30 along the Z-axis direction is, for example, not less than 20 μm and not more than 50 μm. In this example, the thickness of the liquid crystal layer 30 is 30 μm. In other words, the thickness of the liquid crystal layer 30 is the distance along the Z-axis direction between the first substrate unit 10u and the second substrate unit 20u.

The alignment of the liquid crystal of the liquid crystal layer 30 may have a pretilt. In the pretilt, for example, a director 30d of the liquid crystal is oriented from the first substrate unit 10u toward the second substrate unit 20u along the +X direction from the first major electrode 11a toward the second major electrode 11b.

The pretilt angle is the angle between the X-Y plane and the director 30d (the axis of the liquid crystal molecules in the long-axis direction) of the liquid crystal. In the case of the horizontal alignment, the pretilt angle is, for example, less than 45° and greater than 0°. In the case of the vertical alignment, the pretilt angle is, for example, less than 90° and greater than 45°.

For convenience in the specification, the horizontal alignment refers to the case where the pretilt angle is less than 45°; and for convenience, the vertical alignment refers to the case where the pretilt angle is greater than 45°.

For example, the direction of the pretilt can be determined by a crystal rotation method, etc. Also, the direction of the pretilt can be determined by changing the alignment of the liquid crystal by applying a voltage to the liquid crystal layer 30 and by observing the optical characteristics of the liquid crystal layer 30 at this time.

In the case where alignment processing of the first substrate unit 10u is performed by, for example, rubbing, etc., the direction of the alignment processing is along the +X direction. In this example, the direction of the alignment processing of the first substrate unit 10u is, for example, the +X direction.

The axis of the director 30d may be parallel to the +X direction or non-parallel to the +X direction when the director 30d of the liquid crystal is projected onto the X-Y plane. The direction of the pretilt has a +X direction component when the direction of the pretilt is projected onto the X axis.

The alignment direction of the liquid crystal layer 30 proximal to the second substrate unit 20u is antiparallel to the alignment direction of the liquid crystal layer 30 proximal to the first substrate unit 10u. In this example, the direction of the alignment processing of the second substrate unit 20u is the −X direction. In other words, the initial alignment is not a splay alignment.

The first substrate unit 10u may further include an alignment film (not shown). The multiple first electrodes 11 and the multiple second electrodes 12 are disposed between the first substrate 10 and the alignment film of the first substrate unit 10u. The second substrate unit 20u may further include an alignment film (not shown). The opposing electrode 21 is disposed between the second substrate 20 and the alignment film of the second substrate unit 20u. These alignment films may include, for example, polyimide. The initial alignment of the liquid crystal layer 30 is obtained by, for example, performing rubbing of the alignment films. The direction of the rubbing of the first substrate unit 10u is antiparallel to the rubbing direction of the second substrate unit 20u. The initial alignment may be obtained by performing light irradiation of the alignment films.

The case will now be described where the dielectric anisotropy of the liquid crystal included in the liquid crystal layer 30 is positive and the initial alignment is the horizontal alignment.

The liquid crystal alignment of the liquid crystal layer 30 is changed by applying voltages between the opposing electrode 21 and the first electrodes 11 and between the opposing electrode 21 and the second electrodes 12. A refractive index distribution is formed in the liquid crystal layer 30 according to this change. The travel direction of the light that is incident on the liquid crystal optical unit 111 is changed by the refractive index distribution. The change of the travel direction of the light is mainly based on the refraction effect.

The image display unit 80 includes a display unit 86. The display unit 86 is stacked with the liquid crystal optical unit 111. The display unit 86 emits light including image information to be incident on the liquid crystal layer 30. The image display unit 80 may further include a display control unit 87 that controls the display unit 86. The display unit 86 produces light that is modulated based on the signal supplied from the display control unit 87 to the display unit 86. For example, the display unit 86 emits light that includes multiple parallax images. As described below, the liquid crystal optical unit 111 has an operating state in which the optical path is modified, and an operating state in which the optical path is substantially not modified. For example, the image display apparatus 311 provides a three-dimensional display by the light being incident on the liquid crystal optical unit 111 in the operating state in which the optical path is modified. The image display apparatus 311 provides, for example, a two-dimensional image display in the operating state in which, for example, the optical path is substantially not modified.

The drive unit 77 may be connected to the display control unit 87 by a wired or wireless method (an electrical method, an optical method, etc.). The image display apparatus 311 may further include a control unit (not shown) that controls the drive unit 77 and the display control unit 87.

The drive unit 77 is electrically connected to the first electrodes 11, the second electrodes 12, and the opposing electrode 21. For easier viewing of the drawing in FIG. 1, a portion of the interconnects between the drive unit 77 and the first electrodes 11 is not shown; and the interconnects between the drive unit 77 and the second electrodes 12 are not shown.

Figure 2A:
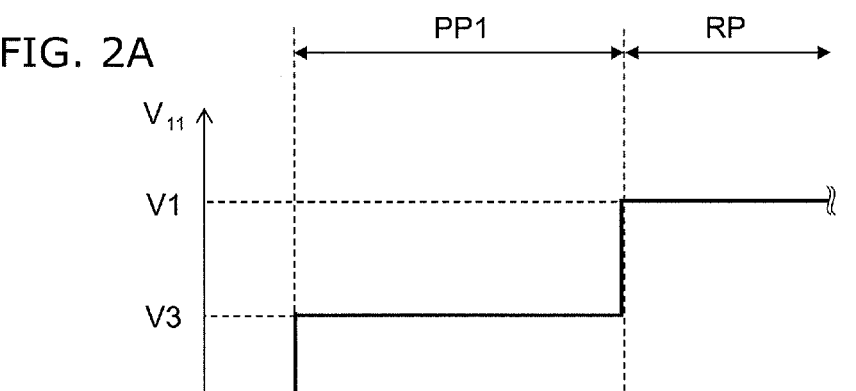
FIG. 2A and FIG. 2B are graphs showing operations of the liquid crystal optical device and the image display apparatus according to the first embodiment.
Figure 2B:
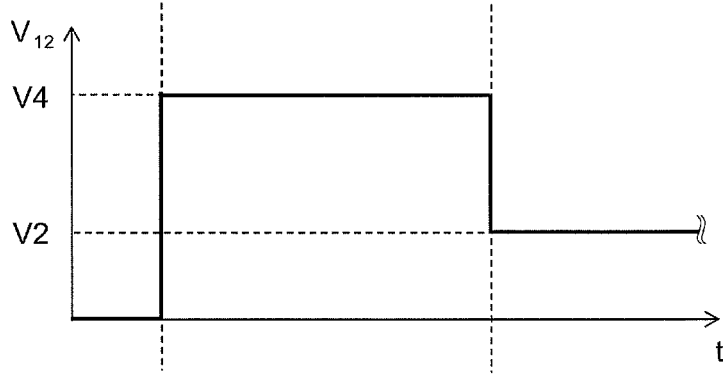

FIG. 2A and FIG. 2B are graphs showing operations of the liquid crystal optical device and the image display apparatus according to the first embodiment.

FIG. 2A and FIG. 2B are graphs showing the operation of the drive unit 77.

In FIG. 2A, the vertical axis is a voltage $V_{11}$ applied between the first electrode 11 and the opposing electrode 21; and the horizontal axis is a time t.

In FIG. 2B, the vertical axis is a voltage $V_{12}$ applied between the second electrode 12 and the opposing electrode 21; and the horizontal axis is the time t.

As shown in FIG. 2A and FIG. 2B, the drive unit 77 implements a refractive index distribution forming operation (a first operation) in a refractive index distribution forming interval RP and implements a first preliminary operation in a first preliminary interval PP1.

In the refractive index distribution forming operation, the drive unit 77 forms a refractive index distribution 31 in the liquid crystal layer 30 by applying a second voltage V2 between the second electrode 12 and the opposing electrode 21 while applying a first voltage V1 between the first electrode 11 and the opposing electrode 21.

The drive unit 77 implements the first preliminary operation prior to the refractive index distribution forming operation. In this example, the drive unit 77 implements the refractive index distribution forming operation directly after the first preliminary operation. The drive unit 77 implements the refractive index distribution forming operation continuously with the first preliminary operation. Other operations may be implemented between the first preliminary operation and the refractive index distribution forming operation.

In the first preliminary operation, the drive unit 77 applies a fourth voltage V4 between the second electrode 12 and the opposing electrode 21 while applying a third voltage V3 between the first electrode 11 and the opposing electrode 21.

The absolute value of the third voltage V3 is less than the absolute value of the first voltage V1. The absolute value of the fourth voltage V4 is greater than the absolute value of the third voltage V3. The absolute value of the fourth voltage V4 is greater than the absolute value of the second voltage V2. The absolute value of the first voltage V1 is greater than the absolute value of the second voltage V2. In this example, the absolute value of the fourth voltage V4 is greater than the absolute value of the first voltage V1. The absolute value of the fourth voltage V4 may be substantially the same as the absolute value of the first voltage V1. The first voltage V1 is, for example, 6 V; and the second voltage V2 is, for example, 3 V.

Thus, in the refractive index distribution forming operation, the drive unit 77 applies a voltage having an absolute value greater than that of the second electrode 12 to the first electrode 11. In the first preliminary operation, a voltage having an absolute value greater than that of the first electrode 11 is applied to the second electrode 12.

The interval prior to the first preliminary interval PP1 (the interval when the first preliminary operation is not implemented) is, for example, an interval when the voltage is not applied between the second electrode 12 and the opposing electrode 21. In other words, in this interval, there is substantially no potential difference between the first electrode 11 and the opposing electrode 21 and no potential difference between the second electrode 12 and the opposing electrode 21. Voltages are applicable between the first electrode 11 and the opposing electrode 21 and between the second electrode 12 and the opposing electrode 21 in the interval prior to the first preliminary interval PP1. In such a case, it is sufficient to set the absolute values of the first to fourth voltages V1 to V4 to be greater than the absolute value of a reference voltage for which the voltage applied beforehand is the reference.

For convenience in the specification, the state in which the potential is the same (is zero volts) between two electrodes also is taken to be included in the state in which the voltage is applied.

The first voltage V1 to the fourth voltage V4 may be direct-current voltages or alternating current voltages. In the case where alternating current voltages are used, the effective value of the third voltage V3 is less than the effective value of the first voltage V1. The effective value of the fourth voltage V4 is greater than the effective value of the third voltage V3. The effective value of the fourth voltage V4 is greater than the effective value of the second voltage V2. The effective value of the first voltage V1 is greater than the effective value of the second voltage V2. The effective value of the fourth voltage V4 is greater than the effective value of the first voltage V1.

For example, the polarities of the first voltage V1 to the fourth voltage V4 may change periodically. For example, the potential of the opposing electrode 21 may be fixed and the potential of the first electrode 11 or the potential of the second electrode 12 may be changed as alternating current. The polarity of the potential of the opposing electrode 21 may be changed periodically; and the potential of the first electrode 11 or the potential of the second electrode 12 may be changed in conjunction with the change of the polarity of the potential of the opposing electrode 21 but with an opposite polarity. In other words, common inversion driving may be performed. Thereby, the power supply voltage of the drive circuit can be reduced; and the breakdown voltage specifications of the drive IC are relaxed.

In the case where the pretilt angle of the liquid crystal layer 30 is relatively small (e.g., not more than 10 degrees), a threshold voltage Vth relating to the change of the liquid crystal alignment of the liquid crystal layer 30 is relatively distinct. In such a case, for example, the first voltage V1 to the fourth voltage V4 are set to be greater than the threshold voltage Vth. The liquid crystal alignment of the liquid crystal layer 30 is changed by the application of the first to fourth voltages V1 to V4.

In the refractive index distribution forming interval RP, an alignment in which the tilt angle of the liquid crystal is large (e.g., the vertical alignment) is formed in the liquid crystal layer 30 in the regions where the first voltage V1 and the second voltage V2 are applied. The effective refractive index of these regions approaches the refractive index ($n_o$) with respect to ordinary light.

On the other hand, a voltage is not applied along the Z-axis direction in the region between the first major electrode 11a and the first sub electrode 12a, the region between the first sub electrode 12a and the second sub electrode 12b, and the region between the second sub electrode 12b and the second major electrode 11b. The initial alignment (e.g., the horizontal alignment) or an alignment that is near the initial alignment is formed in these regions. The refractive index of these regions with respect to the light that vibrates in the X-axis direction approaches the refractive index ($n_e$) with respect to extraordinary light. Thereby, the refractive index distribution 31 is formed in the liquid crystal layer 30.

In the refractive index distribution 31, for example, the change of the refractive index is not less than about 20% and not more than about 80% of the difference between the refractive index for extraordinary light and the refractive index for ordinary light.

In this example, for example, the refractive index distribution 31 has a configuration corresponding to the distribution of the thickness of a Fresnel lens. The liquid crystal optical unit 111 functions as a liquid crystal GRIN lens (Gradient Index lens) in which the refractive index changes in the plane. A lens array that has optical characteristics having a lenticular configuration is formed in the liquid crystal optical unit 111. In this example, a refractive index distribution 31 is formed in the liquid crystal layer 30 in a lens array configuration in which Fresnel lenses extending along the Y-axis direction are multiply arranged in the X-axis direction. The configuration of the refractive index distribution 31 is not limited to a Fresnel lens-like configuration and may be, for example, a convex lens configuration, etc.

In the refractive index distribution 31 that is formed, the position of the central axis 59 corresponds to the position of the lens center; and the positions of the first major electrode 11a and the second major electrode 11b correspond to the positions of the lens ends.

For example, in the liquid crystal optical unit 111, the operating state in which the optical path is modified is obtained when the first voltage V1 and the second voltage V2 are applied; and the operating state in which the optical path is substantially not modified is obtained when the first voltage V1 and the second voltage V2 are not applied.

Figure 3:
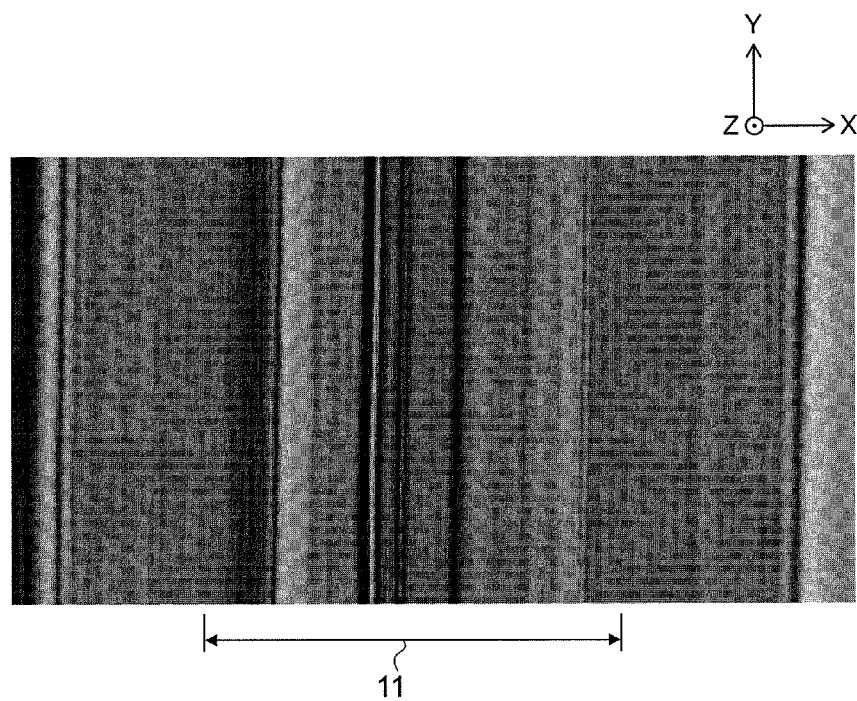
FIG. 3 is a photograph showing characteristics of the liquid crystal optical device and the image display apparatus according to the first embodiment.

FIG. 3 is a photograph showing characteristics of the liquid crystal optical device and the image display apparatus according to the first embodiment.

Figure 4:
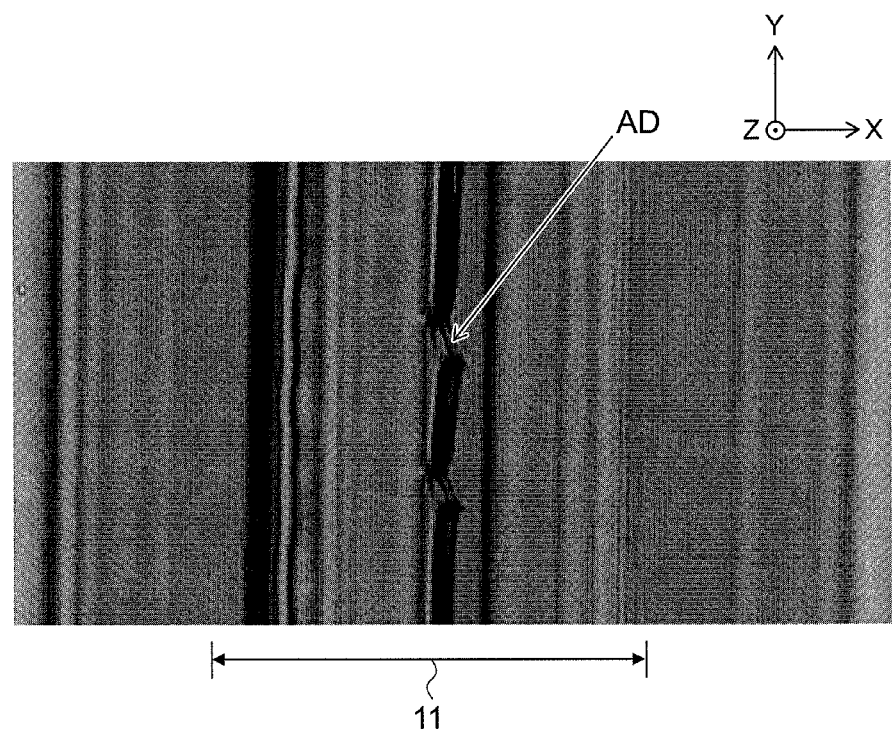
FIG. 4 is a photograph showing characteristics of a liquid crystal optical device and an image display apparatus of a reference example.

FIG. 4 is a photograph showing characteristics of a liquid crystal optical device and an image display apparatus of a reference example.

FIG. 3 and FIG. 4 are photographs showing the states of the liquid crystal optical unit 111 in the refractive index distribution forming operation observed by a polarizing microscope.

For the observation in FIG. 3, the refractive index distribution forming operation is implemented after the first preliminary operation is implemented. On the other hand, for the observation in FIG. 4, the refractive index distribution forming operation is implemented without implementing the first preliminary operation.

In the case where the first preliminary operation is not implemented as shown in FIG. 4, an alignment disorder AD of the liquid crystal is observed, for example, in portions of the liquid crystal layer 30 between the first electrode 11 and the opposing electrode 21, etc. In FIG. 4, for example, disclinations are observed as the alignment disorder AD.

Disclinations occur due to reverse tilt, reverse twist, etc. The disclinations are in unstable states energy-wise because the disclinations are formed at the boundary between alignment domains having different tilt angles and/or twist angles due to a balance between the alignment states of the alignment domains. Then, when some trigger occurs, the disclinations easily change. For example, bending occurs along the extension direction of the electrode at a pitch that is several times the electrode width; and the width of the disclination region is several or more times that of the case where the bending does not occur. In this state in which the bending markedly occurs, the effect of the disclination region on the optical characteristic degradation of the liquid crystal optical unit greatly increases.

Conversely, in the case where the refractive index distribution forming operation is implemented after the first preliminary operation is implemented as shown in FIG. 3, the alignment disorder AD of the liquid crystal is suppressed compared to the case where the first preliminary operation is not implemented. In FIG. 3, the alignment disorder AD is substantially not observed.

Thus, according to the liquid crystal optical device 211 and the image display apparatus 311 according to the embodiment, the occurrence of the alignment disorder AD can be suppressed; and high display quality can be obtained. For example, the occurrence of the disclinations and the waviness of the disclinations can be suppressed.

Figure 5:
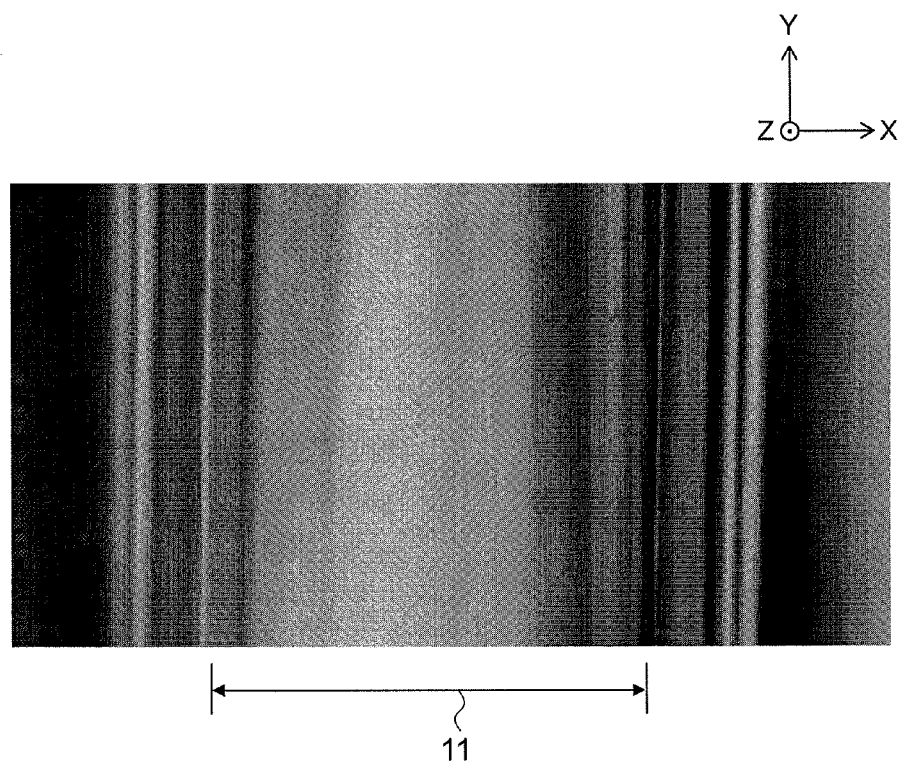
FIG. 5 is a photograph showing characteristics of the liquid crystal optical device and the image display apparatus according to the first embodiment.

FIG. 5 is a photograph showing characteristics of the liquid crystal optical device and the image display apparatus according to the first embodiment.

FIG. 5 is a photograph showing the state of the liquid crystal optical unit 111 in the first preliminary operation observed by a polarizing microscope.

As shown in FIG. 5, in the first preliminary operation as well, the alignment disorder AD of the liquid crystal is substantially not observed.

The fluctuation of the alignment of the liquid crystal is large in the state in which the voltage is not applied between the first electrode 11 and the opposing electrode 21 and between the second electrode 12 and the opposing electrode 21 (the state in which the voltage $V_{11}$ and the voltage $V_{12}$ are the reference voltage). It is considered that the occurrence of the alignment disorder AD is caused by the fluctuation of the alignment of the liquid crystal.

It is considered that the suppression of the alignment disorder AD in the case where the first preliminary operation is implemented is an effect of the electric field that is created by the second electrode 12 to which a high voltage (a voltage having a large absolute value) is applied. For example, the electric field that is created by the second electrode 12 also affects the alignment of the liquid crystal between the first electrode 11 and the opposing electrode 21. Thereby, the alignment of the liquid crystal of the liquid crystal layer 30 is matched between the first electrode 11 and the opposing electrode 21. In other words, it is considered that the fluctuation of the alignment of the liquid crystal of the liquid crystal layer 30 between the first electrode 11 and the opposing electrode 21 is suppressed by the implementation of the first preliminary operation. Thereby, it is considered that the alignment disorder AD is suppressed.

When evaluating the characteristics of the liquid crystal optical device, the inventor of the application discovered that there are cases where the degree of the alignment disorder AD is large and there are cases where the degree of the alignment disorder AD is small. Then, as experiments were performed, it was discovered that there seemed to be a relationship between the alignment disorder AD and the timing when the voltages are applied. Then, as a result of performing investigations of the driving conditions of the drive unit 77, the conditions at which the alignment disorder AD can be reduced were discovered. Namely, it was discovered that the alignment disorder AD can be suppressed by implementing the refractive index distribution forming operation after the first preliminary operation is implemented. This characteristic was first discovered by the experiments and the investigations of the inventor of the application.

In this example, the distance along the X-axis direction between the first electrode 11 and the second electrode 12 is not more than ¼ times the distance in the X-axis direction between the X-axis direction centers of the two most proximal first electrodes 11. Thereby, the electric field can be appropriately applied to the liquid crystal between the first electrode 11 and the opposing electrode 21; and the alignment disorder AD is suppressed more appropriately. In this example, the two second electrodes 12, i.e., the first sub electrode 12a and the second sub electrode 12b, are disposed on the two X-axis direction sides of the first electrode 11. Thereby, the electric field can be appropriately applied to the liquid crystal between the first electrode 11 and the opposing electrode 21; and the alignment disorder AD is further suppressed. There may be one of the second electrodes 12 between the first major electrode 11a and the second major electrode 11b. The second electrode 12 may be adjacent on only one X-axis direction side of the first electrode 11.

Figure 6A:
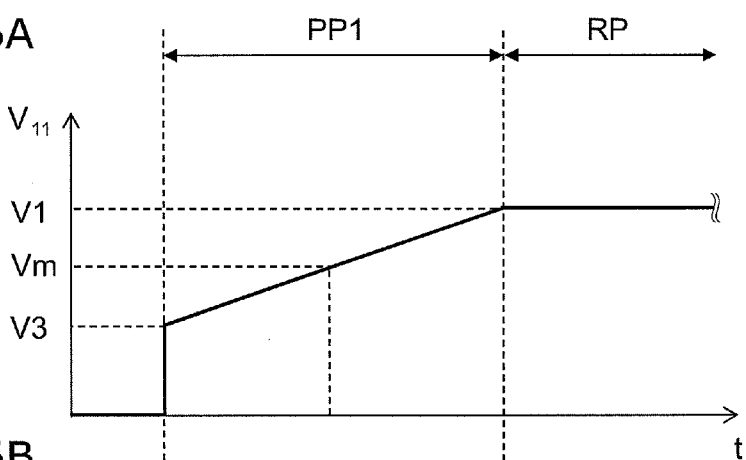
FIG. 6A and FIG. 6B are graphs showing other operations of the liquid crystal optical device and the image display apparatus according to the first embodiment.
Figure 6B:
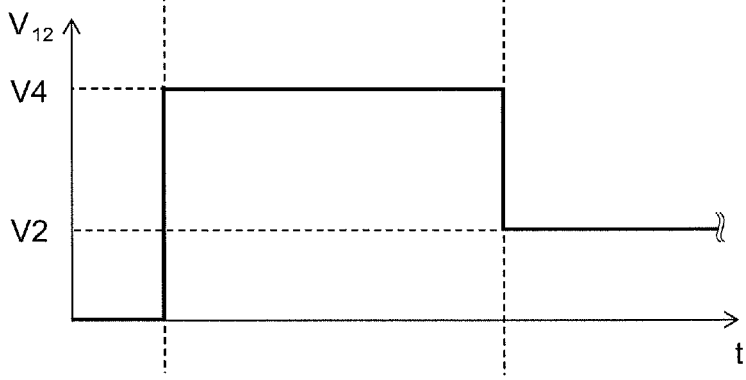

FIG. 6A and FIG. 6B are graphs showing other operations of the liquid crystal optical device and the image display apparatus according to the first embodiment.

In FIG. 6A and FIG. 6B, the vertical axes and the horizontal axes are the same as the vertical axes and the horizontal axes of FIG. 2A and FIG. 2B.

In this example as shown in FIG. 6A and FIG. 6B, the drive unit 77 further applies an intermediate voltage Vm between the first electrode 11 and the opposing electrode 21 after applying the third voltage V3 in the first preliminary operation. The absolute value of the intermediate voltage Vm is less than the absolute value of the first voltage V1 and greater than the absolute value of the third voltage V3. For example, the drive unit 77 causes the voltage $V_{11}$ between the first electrode 11 and the opposing electrode 21 to gradually increase from the third voltage V3 to the first voltage V1 in the first preliminary operation. At this time, the increase rate of the voltage $V_{11}$ is, for example, not less than 6 V/seconds and not more than 60 V/seconds. The increase of the voltage between the third voltage V3 and the first voltage V1 may be continuous or may be performed in stages.

In the case where the voltage is abruptly changed from the third voltage V3 to the first voltage V1, the change of the alignment of the liquid crystal also becomes abrupt which causes the alignment disorder AD. For example, bending disclinations occur easily.

By gradually increasing the voltage $V_{11}$, an abrupt change of the alignment of the liquid crystal can be suppressed; and the occurrence of the alignment disorder AD can be suppressed more appropriately. For example, the occurrence of the disclinations and the waviness of the disclinations can be suppressed more appropriately.

Figure 7A:
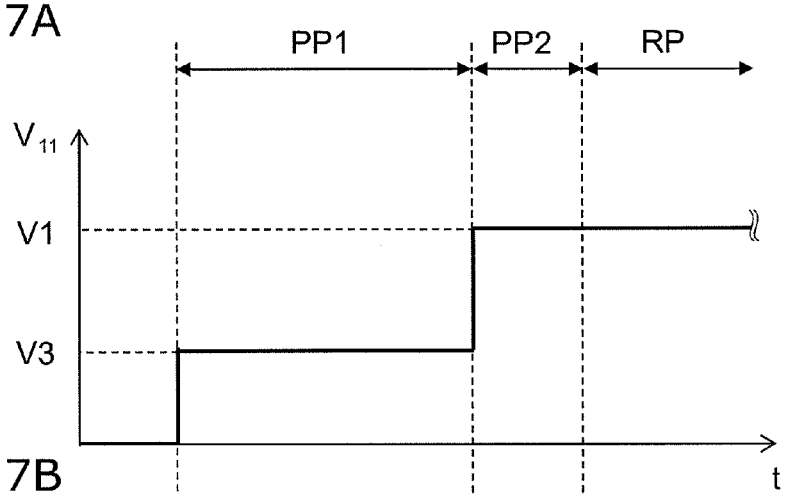
FIG. 7A and FIG. 7B are graphs showing other operations of the liquid crystal optical device and the image display apparatus according to the first embodiment.
Figure 7B:
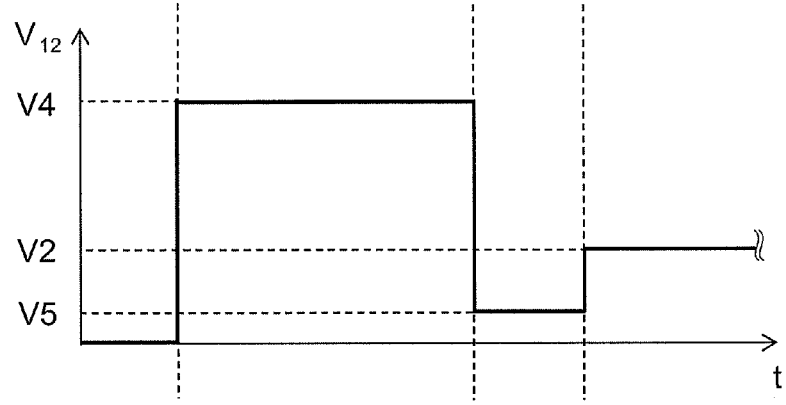

FIG. 7A and FIG. 7B are graphs showing other operations of the liquid crystal optical device and the image display apparatus according to the first embodiment.

In FIG. 7A and FIG. 7B, the vertical axes and the horizontal axes are the same as the vertical axes and the horizontal axes of FIG. 2A and FIG. 2B.

As shown in FIG. 7A and FIG. 7B, in this example, the drive unit 77 further implements a second preliminary operation in a second preliminary interval PP2. The drive unit 77 implements the second preliminary operation between the first preliminary operation and the refractive index distribution forming operation. In the second preliminary operation, the drive unit 77 applies a fifth voltage V5 between the second electrode 12 and the opposing electrode 21. The absolute value of the fifth voltage V5 is less than the absolute value of the second voltage V2. In the second preliminary operation, the drive unit 77 applies the first voltage V1 between the first electrode 11 and the opposing electrode 21. The voltage $V_{11}$ of the second preliminary operation may be the third voltage V3.

In the first preliminary operation, there are cases where the alignment disorder AD occurs in the liquid crystal between the second electrode 12 and the opposing electrode 21 to which the high voltage is applied. By implementing the second preliminary operation, the occurrence of the alignment disorder AD of the liquid crystal between the second electrode 12 and the opposing electrode 21 can be suppressed. In the liquid crystal optical device 211 and the image display apparatus 311, the display quality is higher.

In the second preliminary operation, the first voltage V1 is applied between the first electrode 11 and the opposing electrode 21. Thereby, the electric field that is created by the first electrode 11 affects the alignment of the liquid crystal between the second electrode 12 and the opposing electrode 21. The fluctuation of the alignment of the liquid crystal is suppressed in the liquid crystal layer 30 between the second electrode 12 and the opposing electrode 21. Thereby, the occurrence of the alignment disorder AD of the liquid crystal between the second electrode 12 and the opposing electrode 21 can be suppressed more appropriately.

Figure 8A:
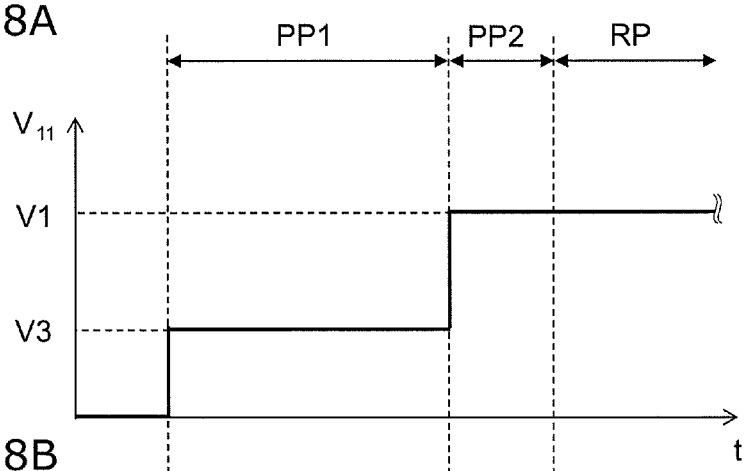
FIG. 8A and FIG. 8B are graphs showing other operations of the liquid crystal optical device and the image display apparatus according to the first embodiment.
Figure 8B:
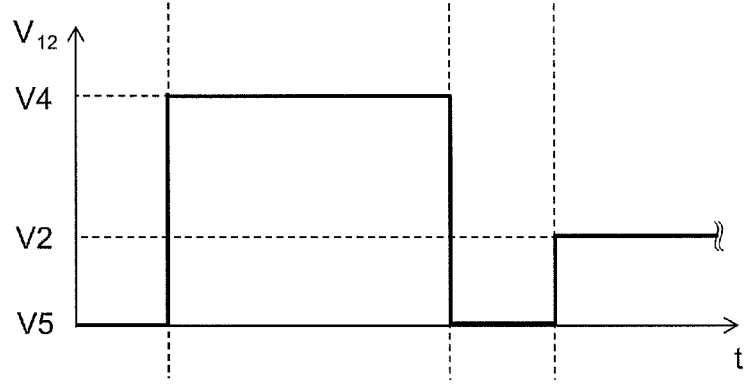

FIG. 8A and FIG. 8B are graphs showing other operations of the liquid crystal optical device and the image display apparatus according to the first embodiment.

In FIG. 8A and FIG. 8B, the vertical axes and the horizontal axes are the same as the vertical axes and the horizontal axes of FIG. 2A and FIG. 2B.

In this example as shown in FIG. 8A and FIG. 8B, the drive unit 77 sets the absolute value (the effective value) of the fifth voltage V5 to be not more than 0.5 V in the second preliminary operation. The drive unit 77 sets the absolute value of the fifth voltage V5 to be substantially 0 V. Thereby, the fluctuation of the alignment of the liquid crystal of the liquid crystal layer 30 between the second electrode 12 and the opposing electrode 21 can be suppressed more appropriately. In the liquid crystal optical device 211 and the image display apparatus 311, the display quality is higher.

FIG. 9A and FIG. 9B are graphs showing other operations of the liquid crystal optical device and the image display apparatus according to the first embodiment.

In FIG. 9A and FIG. 9B, the vertical axes and the horizontal axes are the same as the vertical axes and the horizontal axes of FIG. 2A and FIG. 2B.

In this example as shown in FIG. 9A and FIG. 9B, in the first preliminary operation, the drive unit 77 starts the application of the third voltage V3 after starting the application of the fourth voltage V4. The start of the application of the fourth voltage V4 is, for example, a timing t1 when the voltage $V_{12}$ reaches the fourth voltage V4 from the reference voltage. The start of the application of the third voltage V3 is, for example, a timing t2 when the voltage $V_{11}$ reaches the third voltage V3 from the reference voltage.

By applying the fourth voltage V4 prior to the third voltage V3, for example, the effect of the electric field created by the second electrode 12 on the liquid crystal between the first electrode 11 and the opposing electrode 21 can be increased further. For example, the fluctuation of the alignment of the liquid crystal of the liquid crystal layer 30 between the first electrode 11 and the opposing electrode 21 is suppressed further. Thereby, the display quality of the liquid crystal optical device 211 and the image display apparatus 311 is higher.

Figure 10A:
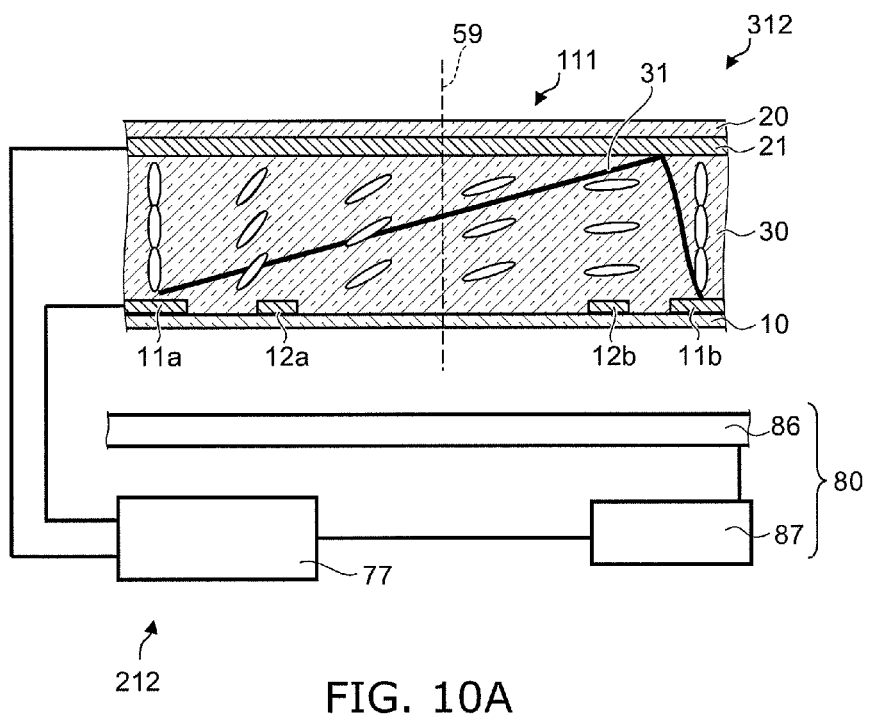
FIG. 10A and FIG. 10B are a schematic cross-sectional view and a graph showing another liquid crystal optical device and image display apparatus according to the first embodiment.
Figure 10B:
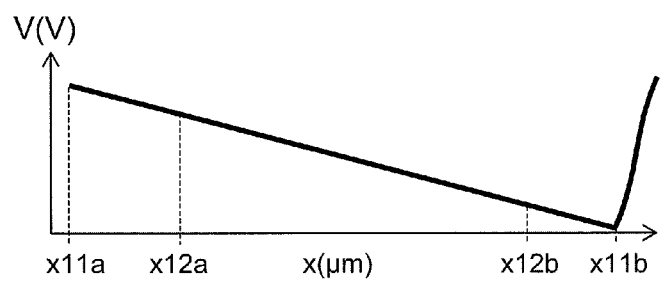

FIG. 10A and FIG. 10B are a schematic cross-sectional view and a graph showing another liquid crystal optical device and image display apparatus according to the first embodiment.

In FIG. 10B, the horizontal axis is the X-axis direction position x (μm); and the vertical axis is the voltage V (V) that is applied to the electrodes.

In the liquid crystal optical device 212 and the image display apparatus 312 of this example as shown in FIG. 10A and FIG. 10B, the drive unit 77 forms a refractive index distribution 31 in a prism configuration in the liquid crystal layer 30.

FIG. 10B shows the concept of the voltages applied to the first electrodes 11 and the second electrodes 12 in the case where the refractive index distribution 31 is formed in the prism configuration. A position x11a of the first major electrode 11a, a position x11b of the second major electrode 11b, a position x12a of the first sub electrode 12a, and a position x12b of the second sub electrode 12b are shown in FIG. 10B.

In the case where the refractive index distribution 31 is formed in the prism configuration as shown in FIG. 10B, for example, voltages are applied to the electrodes to provide asymmetry around the central axis 59 between the first major electrode 11a and the second major electrode 11b (inside one pitch). For example, the highest voltage is applied to the first major electrode 11a; and the lowest voltage is applied to the second major electrode 11b. The voltages applied to the electrodes gradually decrease between the first major electrode 11a and the second major electrode 11b.

In other words, the drive unit 77 applies a voltage that is lower than that of the first major electrode 11a to the first sub electrode 12a, applies a voltage that is lower than that of the first sub electrode 12a to the second sub electrode 12b, and applies a voltage that is lower than that of the second sub electrode 12b to the second major electrode 11b.

The drive unit 77 sets the absolute value of the voltage between the first sub electrode 12a and the opposing electrode 21 to be less than the absolute value of the voltage between the first major electrode 11a and the opposing electrode 21. The drive unit 77 sets the absolute value of the voltage between the second sub electrode 12b and the opposing electrode 21 to be less than the absolute value of the voltage between the first sub electrode 12a and the opposing electrode 21.

More specifically, for example, the drive unit 77 applies a voltage having an effective value of 6 V to the first major electrode 11a, applies a voltage having an effective value of 3 V to the first sub electrode 12a, applies a voltage having an effective value of 1 V to the second sub electrode 12b, and applies a voltage having an effective value of 0 V to the second major electrode 11b. Thereby, the refractive index distribution 31 having the prism configuration can be formed in the liquid crystal layer 30.

Thus, the refractive index distribution 31 formed in the liquid crystal layer 30 may have a lens configuration and may have a prism configuration. Even in the case where the refractive index distribution 31 is formed in the prism configuration, the drive unit 77 implements the refractive index distribution forming operation after implementing the first preliminary operation. Thereby, the display quality of the liquid crystal optical device 212 and the image display apparatus 312 can be increased. In the case where the refractive index distribution 31 is formed in the lens configuration, for example, it is sufficient to apply the voltages to the electrodes to provide symmetry around the central axis 59 between the first major electrode 11a and the second major electrode 11b.

Second Embodiment

Figure 11:
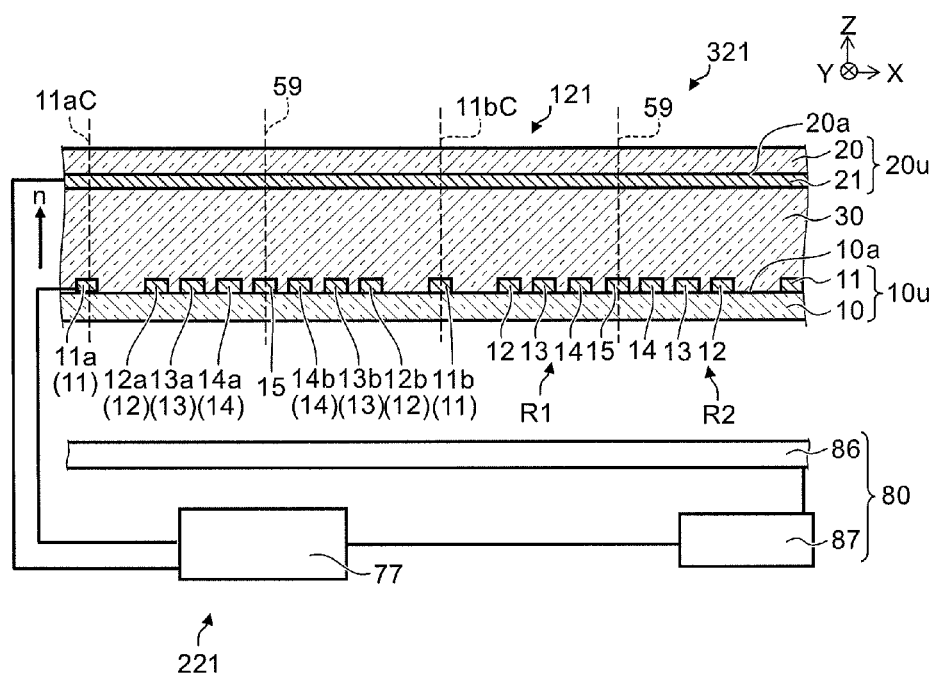
FIG. 11 is a schematic cross-sectional view showing a liquid crystal optical device and an image display apparatus according to a second embodiment.
Figure 12:
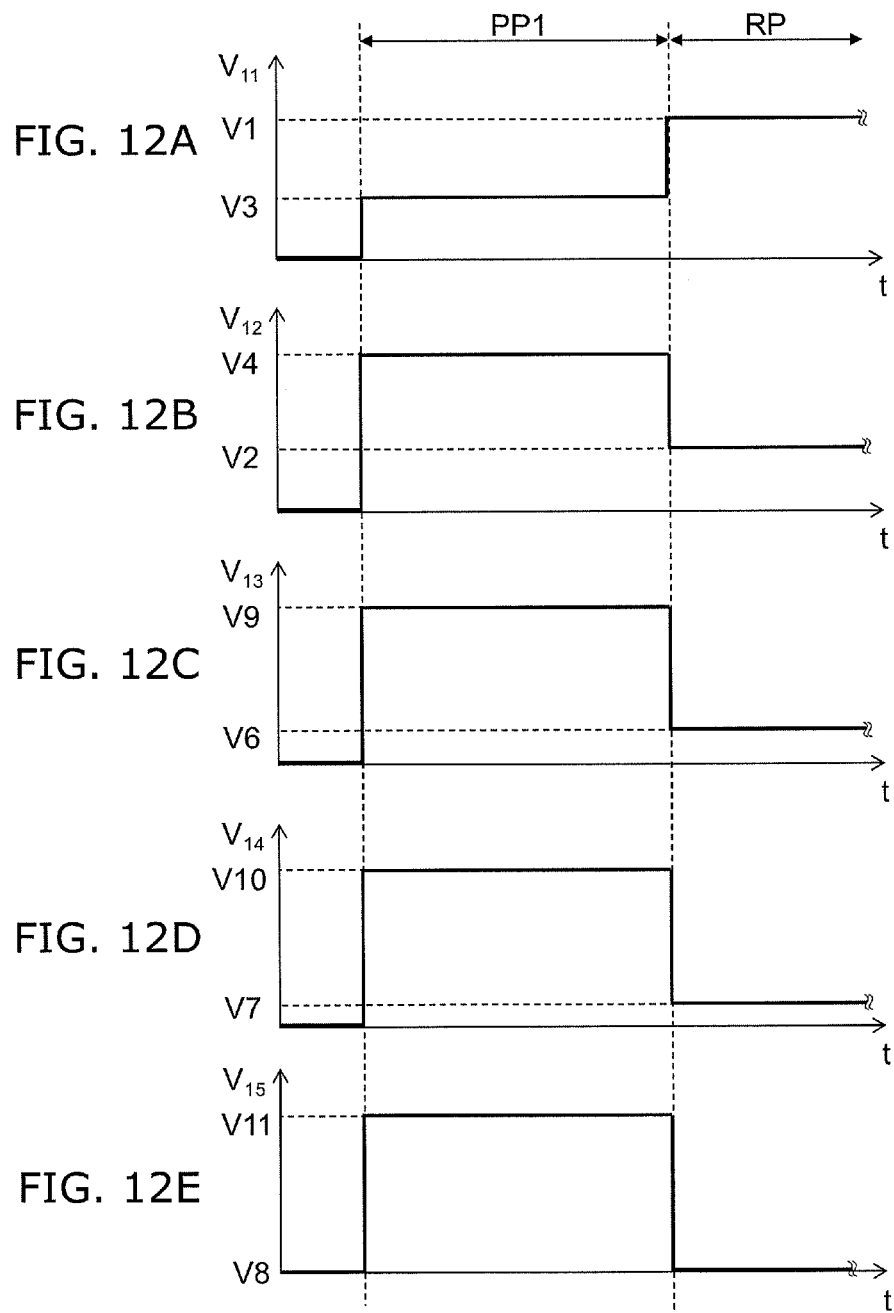
FIG. 12A to FIG. 12E are graphs showing operations of the liquid crystal optical device and the image display apparatus according to the second embodiment.

FIG. 11 is a schematic cross-sectional view showing a liquid crystal optical device and an image display apparatus according to a second embodiment.

In the image display apparatus 321 according to the embodiment as shown in FIG. 11, a liquid crystal optical unit 121 of the liquid crystal optical device 221 further includes a third electrode 13, a fourth electrode 14, and a fifth electrode 15. The third electrode 13, the fourth electrode 14, and the fifth electrode 15 extend along the Y-axis direction. The third electrode 13, the fourth electrode 14, and the fifth electrode 15 are multiply provided. The multiple third electrodes 13 are provided respectively in each space between the multiple first electrodes 11. The multiple fourth electrodes 14 are provided respectively in each space between the multiple first electrodes 11. The multiple fifth electrodes 15 are provided respectively in each space between the multiple first electrodes 11.

The third electrodes 13 include a third sub electrode 13a and a fourth sub electrode 13b. The third sub electrode 13a is provided between the first sub electrode 12a and the central axis 59. The fourth sub electrode 13b is provided between the second sub electrode 12b and the central axis 59.

The fourth electrodes 14 include a fifth sub electrode 14a and a sixth sub electrode 14b. The fifth sub electrode 14a is provided between the third sub electrode 13a and the central axis 59. The sixth sub electrode 14b is provided between the fourth sub electrode 13b and the central axis 59.

The fifth electrode 15 is provided between the fifth sub electrode 14a and the sixth sub electrode 14b. In this example, the fifth electrode 15 overlaps the central axis 59 when projected onto the X-Y plane. For example, the X-axis direction center of the fifth electrode 15 overlaps the central axis 59 when projected onto the X-Y plane.

The drive unit 77 is electrically connected to the first electrodes 11, the second electrodes 12, the third electrodes 13, the fourth electrodes 14, the fifth electrodes 15, and the opposing electrode 21. For easier viewing of the drawing in FIG. 11, a portion of the interconnects between the drive unit 77 and the first electrodes 11 is not shown. The interconnects between the drive unit 77 and the second electrodes 12 are not shown. The interconnects between the drive unit 77 and the third electrodes 13 are not shown. The interconnects between the drive unit 77 and the fourth electrodes 14 are not shown. The interconnects between the drive unit 77 and the fifth electrodes 15 are not shown.

FIG. 12A to FIG. 12E are graphs showing operations of the liquid crystal optical device and the image display apparatus according to the second embodiment.

In FIG. 12A to FIG. 12E, the vertical axes are the voltage $V_{11}$ applied between the first electrode 11 and the opposing electrode 21, the voltage $V_{12}$ applied between the second electrode 12 and the opposing electrode 21, a voltage $V_{13}$ applied between the third electrode 13 and the opposing electrode 21, a voltage $V_{14}$ applied between the fourth electrode 14 and the opposing electrode 21, and a voltage $V_{15}$ applied between the fifth electrode 15 and the opposing electrode 21, respectively. In FIG. 12A to FIG. 12E, the horizontal axis is the time t.

In the refractive index distribution forming operation as shown in FIG. 12A to FIG. 12E, the drive unit 77 applies the first voltage V1 between the first electrode 11 and the opposing electrode 21. The second voltage V2 is applied between the second electrode 12 and the opposing electrode 21. A sixth voltage V6 is applied between the third electrode 13 and the opposing electrode 21. A seventh voltage V7 is applied between the fourth electrode 14 and the opposing electrode 21. An eighth voltage V8 is applied between the fifth electrode 15 and the opposing electrode 21.

In this example, the absolute value of the sixth voltage V6 is less than the absolute value of the second voltage V2. The absolute value of the seventh voltage V7 is less than the absolute value of the sixth voltage V6. The absolute value of the eighth voltage V8 is less than the absolute value of the seventh voltage V7. The absolute value of the eighth voltage V8 is, for example, substantially 0 V. Thus, in the refractive index distribution forming operation, the drive unit 77 applies the highest voltage to the first electrode 11, applies the second highest voltage to the second electrode 12, and applies the lowest voltage to the fifth electrode 15. Thereby, a better refractive index distribution 31 can be formed in the liquid crystal layer 30 in the refractive index distribution forming operation.

In the first preliminary operation, the drive unit 77 applies the third voltage V3 between the first electrode 11 and the opposing electrode 21. The fourth voltage V4 is applied between the second electrode 12 and the opposing electrode 21. A ninth voltage V9 is applied between the third electrode 13 and the opposing electrode 21. A tenth voltage V10 is applied between the fourth electrode 14 and the opposing electrode 21. An eleventh voltage V11 is applied between the fifth electrode 15 and the opposing electrode 21.

In this example, the absolute value of the ninth voltage V9 is substantially the same as the absolute value of the fourth voltage V4. The absolute value of the tenth voltage V10 is substantially the same as the absolute value of the fourth voltage V4. The absolute value of the eleventh voltage V11 is substantially the same as the absolute value of the fourth voltage V4. In other words, in the first preliminary operation, the drive unit 77 applies a voltage that is higher (a voltage having a larger absolute value) than that of the first electrode 11 to the second electrode 12, the third electrode 13, the fourth electrode 14, and the fifth electrode 15.

Thereby, for example, a stronger electric field is applicable to the liquid crystal between the first electrode 11 and the opposing electrode 21. For example, the fluctuation of the alignment of the liquid crystal between the first electrode 11 and the opposing electrode 21 is suppressed further. In the liquid crystal optical device 221 and the image display apparatus 321 according to the embodiment, higher display quality is obtained.

The absolute value of the ninth voltage V9, the absolute value of the tenth voltage V10, and the absolute value of the eleventh voltage V11 may be less than the absolute value of the fourth voltage V4. More electrodes may be provided between the first major electrode 11a and the second major electrode 11b.

Third Embodiment

Figure 13:
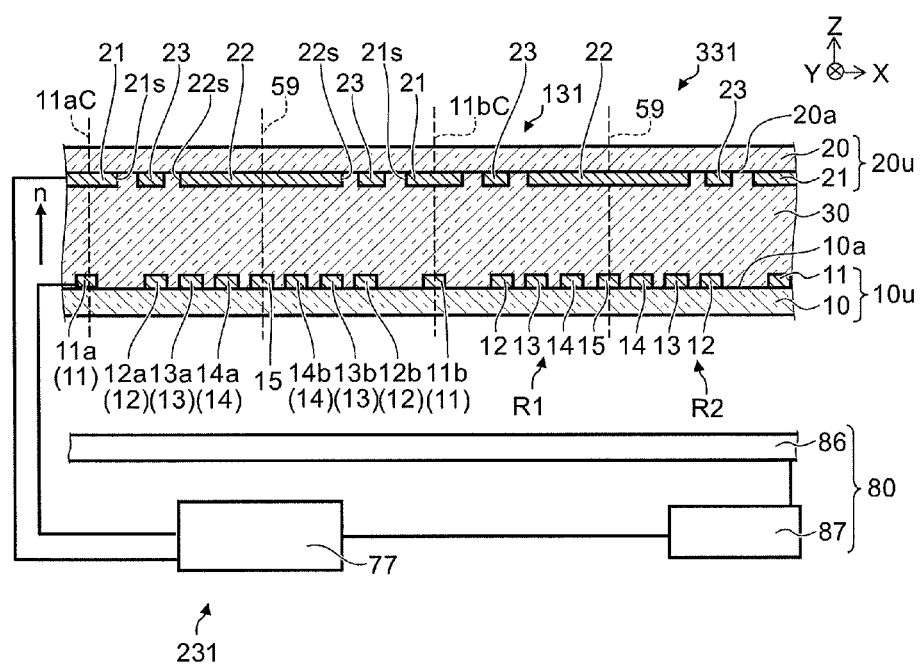
FIG. 13 is a schematic cross-sectional view showing a liquid crystal optical device and an image display apparatus according to a third embodiment.

FIG. 13 is a schematic cross-sectional view showing a liquid crystal optical device and an image display apparatus according to a third embodiment.

In the liquid crystal optical device 231 of the image display apparatus 331 according to the embodiment as shown in FIG. 13, the configuration of the second substrate unit 20u of a liquid crystal optical unit 131 differs from the configuration of the second substrate unit 20u of the embodiments recited above. In this example, the second substrate unit 20u includes the multiple first opposing electrodes 21, multiple second opposing electrodes 22, and multiple third opposing electrodes 23.

The multiple first opposing electrodes 21 are provided on the second major surface 20a. The multiple first opposing electrodes 21 extend in the Y-axis direction and are arranged in a direction non-parallel to the Y-axis direction. The multiple first opposing electrodes 21 are arranged, for example, in the X-axis direction. The multiple first opposing electrodes 21 oppose the multiple first electrodes 11.

The multiple second opposing electrodes 22 are provided respectively in each space between the multiple first opposing electrodes 21 on the second major surface 20a. The multiple second opposing electrodes 22 oppose the multiple third electrodes 13, the multiple fourth electrodes 14, and the multiple fifth electrodes 15.

The multiple third opposing electrodes 23 are provided respectively in each space between the multiple first opposing electrodes 21 and the multiple second opposing electrodes 22 on the second major surface 20a. The multiple third opposing electrodes 23 oppose the multiple second electrodes 12.

A first separating region 21s is provided between the first opposing electrode 21 and the third opposing electrode 23. The first separating region 21s extends in the Y-axis direction. The first separating region 21s is, for example, a slit extending along the Y-axis direction. The first separating region 21s opposes, for example, at least a portion of the region between the first electrode 11 and the second electrode 12.

A second separating region 22s is provided between the second opposing electrode 22 and the third opposing electrode 23. The second separating region 22s extends in the Y-axis direction. The second separating region 22s is, for example, a slit extending along the Y-axis direction. The second separating region 22s opposes, for example, at least a portion of the region between the second electrode 12 and the third electrode 13.

The first separating region 21s and the second separating region 22s are provided, for example, proximally to the region directly above the second electrode 12. The first separating region 21s and the second separating region 22s are provided, for example, proximally to the second electrode 12 when projected onto the X-Y plane.

For example, the first opposing electrodes 21, the second opposing electrodes 22, and the third opposing electrodes 23 are electrically connected. The potential of the first opposing electrodes 21, the potential of the second opposing electrodes 22, and the potential of the third opposing electrodes 23 are set to be substantially the same potential.

In the liquid crystal optical device 231 and the image display apparatus 331 according to the embodiment as well, high display quality can be obtained by implementing the first preliminary operation and the refractive index distribution forming operation as described in regard to FIG. 12A to FIG. 12E. In the liquid crystal optical device 231 and the image display apparatus 331, the refractive index distribution 31 having the Fresnel lens-like configuration can be formed more appropriately in the liquid crystal layer 30 by providing the first separating region 21s and the second separating region 22s.

For example, in the liquid crystal optical unit 131, the voltage $V_{12}$ applied to the second electrodes 12 in the refractive index distribution forming operation is set to be higher (having a larger absolute value) than that of the case of the liquid crystal optical unit 111. Therefore, in the liquid crystal optical unit 131, the suppression of the alignment disorder AD by the second preliminary operation is more pronounced.

Fourth Embodiment

Figure 14:
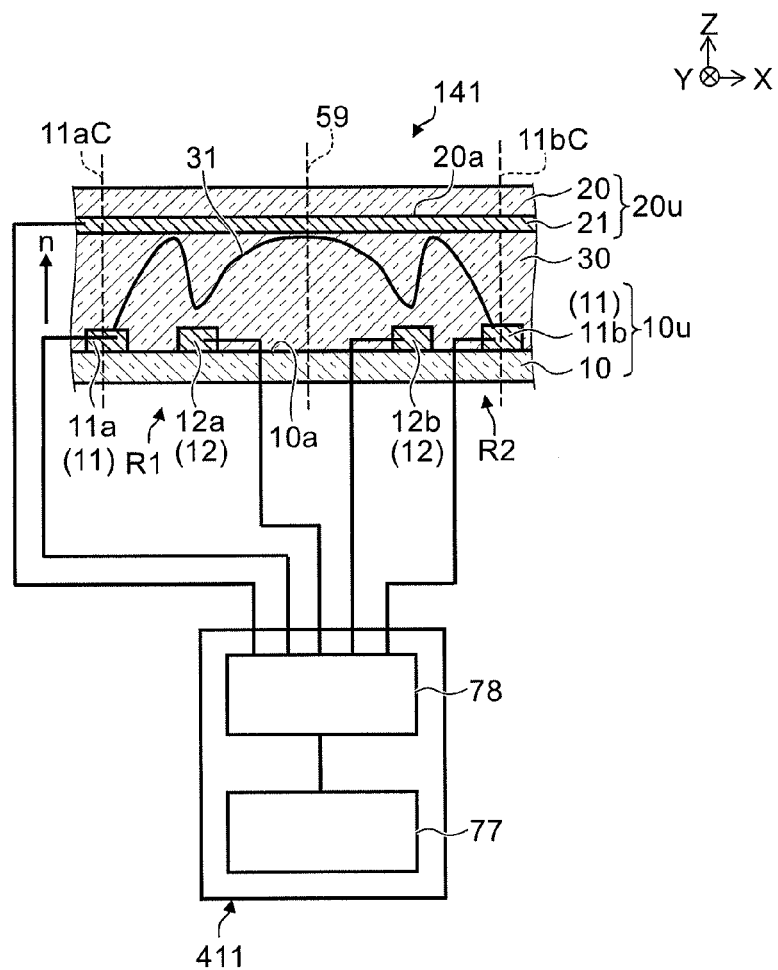
FIG. 14 is a schematic cross-sectional view showing a drive device according to a fourth embodiment.

FIG. 14 is a schematic cross-sectional view showing a drive device according to a fourth embodiment.

As shown in FIG. 14, the drive device 411 includes the drive unit 77 and a connection unit 78.

The drive unit 77 may include the drive units described in the embodiments recited above. The connection unit 78 is electrically connected to a liquid crystal optical unit 141. The liquid crystal optical unit 141 may include the liquid crystal optical unites described in the embodiments recited above. For example, the connection unit 78 is electrically connected to the first electrodes 11, the second electrodes 12, and the opposing electrode 21. For example, the connection unit 78 is connectors and/or interconnects to obtain the electrical connection with the liquid crystal optical unit 141. The connection unit 78 is electrically connected to the drive unit 77. The drive unit 77 is electrically connected to the liquid crystal optical unit 141 via the connection unit 78. The electrical connection between the connection unit 78 and the liquid crystal optical unit 141 may be switched between the connection state and the non-connection state by a connector, etc.

In the drive device 411, the drive unit 77 implements the refractive index distribution forming operation after the first preliminary operation is implemented. Thereby, the display quality of the liquid crystal optical unit 141 that is connected can be increased. The refractive index distribution 31 formed in the liquid crystal layer 30 of the liquid crystal optical unit 141 by the drive device 411 may have a lens configuration or a prism configuration.

The refractive index distribution 31 formed in the liquid crystal layer 30 is not limited to a lens array configuration (a lenticular configuration) and may have a Fresnel lens-like configuration, a single lens configuration such as a convex lens configuration, etc., as shown in FIG. 14.

According to the embodiments, a liquid crystal optical device, an image display apparatus, and a drive device that provide a high-quality display can be provided.

In the specification of the application, "perpendicular" and "parallel" refer to not only strictly perpendicular and strictly parallel but also include, for example, the fluctuation due to manufacturing processes, etc.; and it is sufficient to be substantially perpendicular and substantially parallel. In the specification of the application, the state of being provided on a component includes not only the state of being provided in direct contact with the component but also the state of being provided with another component inserted therebetween. The state of being stacked includes not only the state of overlapping in contact with each other but also the state of overlapping with another component inserted therebetween. The state of being opposed includes not only the state of directly facing each other but also the state of facing each other with another component being inserted therebetween.

Hereinabove, exemplary embodiments of the invention are described with reference to specific examples. However, the invention is not limited to these specific examples. For example, one skilled in the art may similarly practice the invention by appropriately selecting specific configurations of components included in liquid crystal optical devices, image display apparatuses, and drive devices such as liquid crystal optical units, drive units, display units, image display units, connection units, first substrate units, second substrate units, liquid crystal layers, first substrates, second substrates, first electrodes, second electrodes, opposing electrodes, etc., from known art; and such practice is included in the scope of the invention to the extent that similar effects are obtained.

Further, any two or more components of the specific examples may be combined within the extent of technical feasibility and are included in the scope of the invention to the extent that the purport of the invention is included.

Moreover, all liquid crystal optical devices, image display apparatuses, and drive devices practicable by an appropriate design modification by one skilled in the art based on the liquid crystal optical devices, image display apparatuses, and drive devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A liquid crystal optical device, comprising:
   a liquid crystal optical unit including
      a first substrate unit including
         a first substrate having a first major surface,
         a plurality of first electrodes provided on the first major surface to extend in a first direction, and
         a second electrode provided between the first electrodes on the first major surface to extend in the first direction,
      a second substrate unit including
         a second substrate having a second major surface opposing the first major surface, and
         a first opposing electrode provided on the second major surface, and
      a liquid crystal layer provided between the first substrate unit and the second substrate unit; and
   a drive unit electrically connected to the first electrodes, the second electrode, and the first opposing electrode,
   the drive unit being configured to implement a first operation to form a refractive index distribution in the liquid crystal layer and a first preliminary operation prior to the first operation,
   the drive unit being configured to apply a first voltage between the first opposing electrode and the first electrodes and apply a second voltage between the first opposing electrode and the second electrode in the first operation,
   the drive unit being configured to apply a third voltage between the first opposing electrode and the first electrodes and apply a fourth voltage between the first opposing electrode and the second electrode in the first preliminary operation,
   an absolute value of the third voltage being less than the absolute value of the first voltage,
   an absolute value of the fourth voltage being greater than the absolute value of the third voltage.

2. The device according to claim 1, wherein the absolute value of the fourth voltage is greater than the absolute value of the second voltage.

3. The device according to claim 1, wherein
   a plurality of the second electrodes are provided between two most proximal first electrodes,
   one of the second electrodes is provided between a central axis and one of the two most proximal first electrodes, the central axis being parallel to the first direction to pass through a midpoint of a line segment connecting a center in a second direction of the one of the two most proximal first electrodes to a center in the second direction of the other of the two most proximal first electrodes, the second direction being perpendicular to the first direction and parallel to the first major surface, and
   one other of the second electrodes is provided between the central axis and the other of the two most proximal first electrodes.

4. The device according to claim 3, wherein
   the drive unit causes an absolute value of a voltage between the first opposing electrode and the one of the second electrodes to be less than the absolute value of a voltage between the first opposing electrode and the one of the two most proximal first electrodes, and
   the drive unit causes an absolute value of a voltage between the first opposing electrode and the one other of the second electrodes to be less than the absolute value of the voltage between the first opposing electrode and the one of the second electrodes.

5. The device according to claim 1, wherein
   the drive unit further applies an intermediate voltage between the first opposing electrode and the first electrodes after applying the third voltage in the first preliminary operation before the first operation, and
   an absolute value of the intermediate voltage is less than the absolute value of the first voltage and greater than the absolute value of the third voltage.

6. The device according to claim 5, wherein the drive unit gradually increases the voltage between the first opposing electrode and the first electrodes from the third voltage to the first voltage in the first preliminary operation.

7. The device according to claim 1, wherein
   the drive unit further implements a second preliminary operation between the first preliminary operation and the first operation,
   the drive unit applies a fifth voltage between the first opposing electrode and the second electrode in the second preliminary operation, and an absolute value of the fifth voltage is less than the absolute value of the second voltage.

8. The device according to claim 7, wherein the absolute value of the fifth voltage is not more than 0.5 V.

9. The device according to claim 1, wherein the drive unit starts the application of the third voltage after starting the application of the fourth voltage in the first preliminary operation.

10. The device according to claim 1, wherein the absolute value of the first voltage is greater than the absolute value of the second voltage.

11. The device according to claim 1, wherein the absolute value of the fourth voltage is greater than the absolute value of the first voltage.

12. The device according to claim 1, wherein
the second electrode is provided between a central axis and one of two most proximal first electrodes, the central axis being parallel to the first direction to pass through a midpoint of a line segment connecting a center in a second direction of the one of the two most proximal first electrodes to a center in the second direction of the other of the two most proximal first electrodes, the second direction being perpendicular to the first direction and parallel to the first major surface, and
the first substrate unit further includes:
a third electrode provided between the second electrode and the central axis;
a fourth electrode provided between the third electrode and the central axis; and
a fifth electrode overlapping the central axis when projected onto a plane parallel to the first major surface.

13. The device according to claim 12, wherein
the drive unit is configured to apply a sixth voltage between the third electrode and the first opposing electrode, apply a seventh voltage between the fourth electrode and the first opposing electrode, and apply an eighth voltage between the fifth electrode and the first opposing electrode in the first operation,
an absolute value of the sixth voltage is less than the absolute value of the second voltage,
an absolute value of the seventh voltage is less than an absolute value of the sixth voltage,
an absolute value of the eighth voltage is less than an absolute value of the seventh voltage,
the drive unit is configured to apply a ninth voltage between the third electrode and the first opposing electrode, apply a tenth voltage between the fourth electrode and the first opposing electrode, and apply an eleventh voltage between the fifth electrode and the first opposing electrode in the first preliminary operation,
an absolute value of the ninth voltage is greater than the absolute value of the third voltage,
an absolute value of the tenth voltage is greater than the absolute value of the sixth voltage,
an absolute value of the eleventh voltage is greater than the absolute value of the seventh voltage.

14. The device according to claim 12, wherein
a plurality of the first opposing electrodes are provided,
each of the first opposing electrodes extends in the first direction, the first opposing electrodes are arranged in a direction non-parallel to the first direction, and the first opposing electrodes oppose the first electrodes,
the second substrate unit further includes:
a second opposing electrode electrically connected to the first opposing electrodes, the second opposing electrode being provided between one of the first opposing electrodes and one other of the first opposing electrodes, the one of the first opposing electrodes opposing the one of the two most proximal first electrodes, the one other of the first opposing electrodes opposing the other of the two most proximal first electrodes, the second opposing electrode opposing the third electrode, the fourth electrode, and the fifth electrode; and
a third opposing electrode provided between the one of the first opposing electrodes and the second opposing electrode, the third opposing electrode opposing the second electrode, the third opposing electrode being electrically connected to the first opposing electrodes and the second opposing electrode,
a region between the one of the first opposing electrodes and the third opposing electrode being configured to oppose at least a portion of a region between the first electrode and the second electrode, and
a region between the second opposing electrode and the third opposing electrode being configured to oppose at least a portion of a region between the second electrode and the third electrode.

15. The device according to claim 12, wherein
a plurality of the second electrodes, a plurality of the third electrodes, and a plurality of the fourth electrodes are provided between the two most proximal first electrodes,
one of the second electrodes is provided between the central axis and the one of the two most proximal first electrodes,
one other of the second electrodes is provided between the central axis and the other of the two most proximal first electrodes,
one of the third electrodes is provided between the central axis and the one of the second electrodes,
one other of the third electrodes is provided between the central axis and the one other of the second electrodes,
one of the fourth electrodes is provided between the central axis and the one of the third electrodes, and
one other of the fourth electrodes is provided between the central axis and the one other of the third electrodes.

16. The device according to claim 1, wherein
the second electrode is provided between a central axis and one of two most proximal first electrodes, the central axis being parallel to the first direction to pass through a midpoint of a line segment connecting a center in a second direction of the one of the two most proximal first electrodes to a center in the second direction of the other of the two most proximal first electrodes, the second direction being perpendicular to the first direction and parallel to the first major surface, and
a distance along the second direction between the second electrode and the one of the two most proximal first electrodes is not more than ¼ times a distance along the second direction between the center of the one of the two most proximal first electrodes and the center of the other of the two most proximal first electrodes.

17. The device according to claim 1, wherein a dielectric anisotropy of a liquid crystal included in the liquid crystal layer is positive.

18. The device according to claim 1, wherein the first electrodes, the second electrode, and the first opposing electrode include an oxide including at least one element selected from the group consisting of In, Sn, Zn, and Ti and are transmissive to light.

19. An image display apparatus, comprising:
the liquid crystal optical device according to claim 1; and
an image display unit stacked with the liquid crystal optical unit, the image display unit including a display unit configured to emit light including image information to be incident on the liquid crystal layer.

20. A drive device, comprising:

a connection unit electrically connected to a liquid crystal optical unit, the liquid crystal optical unit including
  a first substrate unit including
    a first substrate having a first major surface,
    a plurality of first electrodes provided on the first major surface to extend in a first direction, and
    a second electrode provided between the first electrodes on the first major surface to extend in the first direction,
  a second substrate unit including
    a second substrate having a second major surface opposing the first major surface, and
    a first opposing electrode provided on the second major surface, and
  a liquid crystal layer provided between the first substrate unit and the second substrate unit; and a drive unit electrically connected to the first electrodes, the second electrode, and the first opposing electrode via the connection unit, the drive unit being configured to implement a first operation to form a refractive index distribution in the liquid crystal layer and a first preliminary operation prior to the first operation, the drive unit being configured to apply a first voltage between the first opposing electrode and the first electrodes and apply a second voltage between the first opposing electrode and the second electrode in the first operation, the drive unit being configured to apply a third voltage between the first opposing electrode and the first electrodes and apply a fourth voltage between the first opposing electrode and the second electrode in the first preliminary operation, an absolute value of the third voltage being less than the absolute value of the first voltage, an absolute value of the fourth voltage being greater than the absolute value of the third voltage.

* * * * *